US008232761B1

(12) United States Patent
Thivierge et al.

(10) Patent No.: US 8,232,761 B1
(45) Date of Patent: Jul. 31, 2012

(54) POWER CONDITIONER FOR MICROBIAL FUEL CELLS

(75) Inventors: Daniel P. Thivierge, Warren, RI (US); Promode R. Bandyopadhyay, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 506 days.

(21) Appl. No.: 12/587,323

(22) Filed: Sep. 30, 2009

(51) Int. Cl.
*H01M 10/44* (2006.01)
*H01M 8/00* (2006.01)
*H02J 1/10* (2006.01)

(52) U.S. Cl. ............ 320/101; 320/138; 320/139; 429/2; 429/400; 429/426; 429/480; 429/900; 363/65; 323/906; 903/944

(58) Field of Classification Search .................... 320/101
See application file for complete search history.

(56) References Cited

U.S. PATENT DOCUMENTS

| 6,166,934 | A  | * | 12/2000 | Kajouke et al. | 363/65 |
| 6,686,075 | B2 | * | 2/2004 | Gieshoff et al. | 429/2 |
| 7,178,616 | B2 | * | 2/2007 | Botti et al. | 180/65.1 |
| 2002/0025456 | A1 | * | 2/2002 | Gieshoff et al. | 429/2 |
| 2004/0175598 | A1 | * | 9/2004 | Bliven et al. | 429/12 |
| 2004/0219399 | A1 | * | 11/2004 | Zhu et al. | 429/13 |
| 2005/0079396 | A1 | * | 4/2005 | Ozeki et al. | 429/23 |
| 2007/0190369 | A1 | * | 8/2007 | Leach et al. | 429/9 |
| 2008/0174278 | A1 | * | 7/2008 | Masias et al. | 320/138 |
| 2008/0292912 | A1 | * | 11/2008 | Logan et al. | 429/2 |

* cited by examiner

*Primary Examiner* — Yalkew Fantu
(74) *Attorney, Agent, or Firm* — James M. Kasischke; Michael P. Stanley; Jean-Paul A. Nasser

(57) ABSTRACT

A two-stage voltage step-up converter and energy storage system is utilized for harvesting trickling electrons from benthic microbe habitats. A relatively random low voltage from the microbial fuel cell (less than about 0.8 VDC) is provided to the first stage step-up converter, which stores power in a first output storage device. A first comparator circuit turns on the second stage step-up converter to transfer energy from the first output storage device to a second output storage device. A second comparator circuit intermittently connects the load to the second output storage device. After initial start-up, the system is self-powered utilizing the first and second output devices but may use a battery for the initial start-up, after which an automatic switch can switch the battery out of the circuit.

14 Claims, 3 Drawing Sheets

POWER CONDITIONER FOR MICROBIAL FUEL CELLS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION

1. Field of the Invention

The present invention relates generally to microbial fuel cells (MFCs) and, more particularly to an energy conversion system that efficiently collects, stores, and converts the trickling energy continuously produced by a microbial fuel cell into a form that is compatible with conventional storage devices and/or electronic systems.

2. Description of the Prior Art

Microbes have inhabited the seafloors around the world since the early days of this planet's existence. Such seafloor regions are anaerobic wherein the microbes gain energy by using the prevalent iron oxides and organic matters found on the seafloor. By colonizing conducting surfaces that act as sinks of electrons, microbial fuel cells (MFCs) convert organic matter to electricity.

A MFC system is typically a large array of conductive plates deployed on the ocean floor. Approximately half of these plates are positioned in the ocean floor sediment (anodes) and the rest of the plates are suspended in water above the ocean floor (cathodes). Microbes colonize these plates and convert organic matter prevalent on the seafloor to electricity, which is collected by the conductive plates. The anodes become negatively charged and the suspended cathodes become positively charged.

The open-circuit or unloaded voltage potential present between the anodes and cathodes has been found to range from approximately 0.6VDC to 0.8VDC. However, the loaded MFC voltage output may decrease significantly as an external electrical load is applied between the anodes and corresponding cathodes.

Individual cables may be attached to the anodes and cathodes of the MFC system, brought to the surface and/or to an underwater position, and may be connected in parallel at the input to the power converter/storage system described in this disclosure.

Unattended sensors used in an ocean environment typically require the replacement of batteries in which this replacement involves considerable logistics and time. In difficult to reach locations, the replacement cost might even be on the order of $100K/sensor.

Most commercially available oceanographic equipment, including sensors, lanterns, and acoustic pingers are battery-operated and require supply voltages from 3VDC to 24VDC to operate. Traditionally, such sensors require on-board batteries for power. Such devices cannot be directly powered from the MFC. In addition, such devices may often have continuous power ratings in excess of what is continuously available from the MFC.

Furthermore, commercially-available power converters are unsuitable for use with MFCs. All known commercially-available voltage converters have a minimum voltage input requirement that is at least 4-5 times greater (2-3VDC) than the maximum voltage available from the MFC. In addition, these converters require input current levels in excess of those available from the MFC. Previously-developed MFC power conditioners have been found to be unsatisfactory due to the difficulties of harvesting the highly variable and low voltage/current outputs of such fuel cells.

The following U.S. patents describe various prior art systems that may be related to the above and/or other MFC power conditioners:

U.S. Pat. No. 5,976,719 teaches a biofuel cell which can react with an electrode without mediator. The microorganism of a biofuel cell can directly consume the electrons generated from a fermentative metabolism of the microorganism through an electron metabolism without energy conservation. Therefore, if waste water is utilized as a fuel (substrate) in the biofuel cell, the amount of sludge production will be reduced and the efficiency of catabolizing organic materials will be increased.

U.S. Pat. No. 5,427,871 relates to galvanic seawater cells and batteries and in particular to cathodes which are suitable for use in galvanic cells that use an oxidant dissolved in the electrolyte as depolarizer. An example of such cells is a seawater cell which uses the oxygen dissolved in the seawater as oxidant. The cell has an inert electrode which consists of a number of conducting fibers connected to a conducting body. The fibers have different orientations relative to each other and to the body. The electrode body consists of two or more wires which are twisted together to constitute an electrode stem while clamping the fibers in a fixed position between the wires, as in a laboratory bottle brush.

U.S. Pat. No. 6,913,854 teaches generating power from voltage gradients at sediment-water interfaces or within stratified euxinic water-columns. Natural voltage gradients typically exist at and about sediment-water interfaces or in isolated water bodies. One electrode (anode) is positioned in the sediment or water just below the redox boundary and the other electrode (cathode) is positioned in the water above the redox boundary over the first electrode. The anode is lower in voltage than the cathode. Current will flow when the electrodes are connected through a load, and near-perpetual generating of worthwhile power may be sustained by the net oxidation of organic matter catalyzed by microorganisms.

U.S. Pat. No. 7,160,637 teaches a miniaturized microbial fuel cell which derives electrical power from the biological activity of microbes, typically the metabolism of glucose by baker's yeast. Microfabrication techniques are used to miniaturize the components as well as the overall fuel cell and are capable of integration with other biomedical and implantable devices. Substantial reductions in both the size and the cost of implantable systems are thereby achievable. Electrode structures are used that facilitate electron transfer and power production giving favorable power densities in a miniature fuel cell. In addition, the microbial fuel cell of the present invention extracts glucose or other metabolite(s) from the ambient body fluids as its fuel, thus achieving a renewable, long-term power source for implantable biomedical devices.

U.S. Pat. No. 7,491,453 teaches systems and processes for producing hydrogen using bacteria. One process for producing hydrogen uses a system for producing hydrogen which includes a reactor. Anodophilic bacteria are disposed within the interior of the reactor and an organic material oxidizable by an oxidizing activity of the anodophilic bacteria is introduced and incubated under oxidizing reactions conditions such that electrons are produced and transferred to the anode. A power source is activated to increase a potential between the anode and the cathode, such that electrons and protons combine to produce hydrogen gas. The system includes a reaction chamber having a wall defining an interior of the reactor and an exterior of the reaction chamber. An anode is provided which is at least partially-contained within the interior of the reaction chamber and a cathode is also provided which is at least partially contained within the interior of the reaction chamber. The cathode is spaced apart at a distance in the range between 0.1-100 centimeters, inclusive, from the anode. A conductive conduit for electrons is provided which is in electrical communication with the anode and the cathode and a power source for enhancing an electrical potential between the anode and cathode is included, which is in electrical communication with the cathode. A first channel defining a passage from the exterior of the reaction chamber to the interior of the reaction chamber is also included.

U.S. Pat. No. 7,507,341 teaches a method of converting biological material into energy resources, which includes transmitting biological material to a pulsed electric field (PEF) station, and applying a PEF to the biological material within a treatment zone in the PEF station to generate treated biological material. The method also includes transmitting the treated biological material to a biogenerator, and processing the treated biological material in the biogenerator to produce an energy resource. A converter may carry out this process, and may include the PEF station and the biogenerator.

United States Publication No. 2007/0048577 teaches a fuel cell having: a proton exchange membrane; anode and cathode housings containing chambers; a three-dimensional anode and cathode. Each housing may have a feed passage, a waste passage, and two through passages. The anode feed passage and the anode waste passage are each coupled to the anode chamber and to one of the cathode through passages and vice versa. The anode chamber may have bacteria capable of donating electrons to the anode upon exposure to a fuel. Solutions may be circulated through the passages and chambers.

United States Publication No. 2007/0134520 teaches power generation performed by immobilizing an electron mediator having a standard electrode potential at pH 7 in the range of −0.13 V to −0.28 V to one of a pair of electrodes to form an anode and electrically connecting the other electrode as a cathode to the anode to form a closed circuit, bringing the anode into contact with microorganisms capable of growing under anaerobic conditions and a solution or suspension containing an organic substance to advance the oxidation reaction by microorganisms using the organic substance as an electron donor, separating the cathode and the solution or suspension through an electrolyte membrane to advance the reduction reaction using oxygen as an electron acceptor at the cathode, and accelerating the oxidation reaction in the biological system.

U.S. Publication No. 2007/0259216 teaches a microbial fuel cell configuration which includes a substrate particularly formulated for a microbial fuel cell configured to produce electricity and/or a modified microbial fuel cell configured to produce hydrogen. A substrate formulation includes a solid biodegradable organic material in a package porous to bacteria. A microbial fuel cell includes an anode, a cathode, an electrically conductive connector connecting the anode and the cathode, a housing for an aqueous medium, the aqueous medium in contact with the anode, and a solid form of a biodegradable organic substrate disposed in the aqueous medium. The solid form of a biodegradable organic substrate is formulated to support electron generation and transfer to the anode by anodophilic bacteria over a selected minimum period of time.

The above-cited prior art does not disclose a circuit that can realistically be utilized to harvest power from an MFC—over an extended period of time. As such, a continuing need exists for the solutions to power problems such as the above described problems and/or related problems. Consequently, those skilled in the art will appreciate the present invention that addresses the above and other problems.

SUMMARY OF THE INVENTION

It is a general purpose and primary object of the present invention to provide an apparatus to harvest energy from a microbial fuel cell (MFC).

It is a further object of the present invention to provide an energy conversion and storage system that efficiently collects and converts the trickling energy being produced continuously by a MFC into a form that is compatible with conventional storage devices and electronic systems.

It is a still further object of the present invention to provide means to step up the low voltage from the MFC to a voltage level appropriate for a particular piece of equipment and to store the energy for intermittent powering of the particular device.

It is a still further object of the present invention to provide a converter designed to run off unique and limited MFC voltage levels.

Accordingly, the present invention comprises an energy conversion and storage system for use with a microbial fuel cell in powering an electrical load, wherein the microbial fuel cell produces an output voltage of less than 0.8VDC.

In the invention, a first power converter stage is electrically connected to the microbial fuel cell. The first power converter stage includes a first integrated converter circuit and a first output storage device. The first integrated converter circuit includes a power input for operating power, which is electrically connected to the first output storage device. As such, the device is self-powered.

However, if the first output storage device is initially uncharged, then means are provided for initially providing operating power to the first integrated converter circuit until the first output storage device is sufficiently charged to provide operating power for the first integrated converter circuit.

A second power converter stage may be connected to the first output storage device. The second power converter stage may be utilized to further increase the voltage output from the first power converter stage. The second power converter stage includes a second integrated converter circuit and a second output storage device.

A first comparator circuit is operable for turning ON the second power converter stage when a first output storage device voltage reaches a first predetermined voltage level and for turning OFF the second power converter stage when the first output storage device voltage drops to a second predetermined voltage level—which is less than the first predetermined voltage.

A second comparator circuit is provided and operable to connect the second output storage device to the electrical load when a second output storage device voltage reaches a first predetermined load voltage level and for disconnecting the second output storage device from the electrical load when the second output storage device voltage drops to a second predetermined load voltage level which is less than the first predetermined load voltage level.

The means for powering the first integrated converter circuit can include a battery. In one embodiment, the power input of the first integrated converter circuit is connected to the battery and the first output storage device through a diode "OR"ing circuit. The diode "OR"ing circuit is then operable to electrically connect the battery to the power input of the first power converter stage to initially provide operating power for the first integrated converter circuit. The diode "OR"ing circuit is also operable to disconnect the battery from the power input of the first integrated converter circuit after the first output storage device is sufficiently charged to power the first integrated converter circuit.

The energy conversion and storage system may include a current control circuit operable for turning OFF the first integrated converter circuit when a current from the microbial fuel cell is greater than a predetermined current level and for turning ON the first integrated converter circuit when the current from the microbial fuel cell is less than the predetermined current level. The predetermined current level may be adjustable.

The energy conversion and storage system may include a voltage control circuit operable for turning OFF the first integrated converter circuit when the voltage from the microbial fuel cell is lower than a predetermined voltage level and for turning ON the first integrated converter circuit when the voltage from the microbial fuel is cell is greater than the predetermined voltage level. The predetermined voltage level may be adjustable.

The second output storage device may be electrically connected to a power input of the second integrated converter circuit to provide operating power for the second integrated converter circuit. As discussed hereinbefore, the device is preferably self-powered.

The second integrated converter circuit is operable for producing an output hysteresis band for the second output storage device voltage with a cycle time of greater than one day.

The present invention also provides a method for energy conversion and storage for use with a microbial fuel cell in powering the electrical load. The method provides steps such as providing a first power converter stage connected to the microbial fuel cell and for providing a first output storage device and a first integrated converter circuit for the first power converter stage. Other steps comprise electrically connecting the first output storage device to a power input of the first integrated converter circuit to provide operating power for the first power converter stage.

In one possible embodiment, the method may comprise initially providing operating power for the first integrated converter circuit until the first output storage device is sufficiently charged to provide operating power for the first integrated converter circuit and afterwards providing operating power for the first integrated converter circuit utilizing power from the first output storage device. The method may also comprise providing a second power converter stage which comprises a second output storage device and a second integrated converter circuit.

The method may comprise providing a first comparator circuit for turning ON the second integrated converter circuit when a first output storage device voltage reaches a first predetermined voltage level and for turning OFF the second integrated converter circuit when the first output storage device voltage drops to a second predetermined voltage level which is less than the first predetermined voltage.

The method may also comprise providing a second comparator circuit to connect the second output storage device to the electrical load when a second output storage device voltage reaches a first predetermined load voltage level and for disconnecting the second output storage device from the electrical load when the second output storage device voltage drops to a second predetermined load voltage level which is less than the first predetermined load voltage level.

The method may further comprise utilizing a battery for initially providing operating power to the first integrated converter circuit until the first output storage device is sufficiently charged in order to provide operating power for the first integrated converter circuit.

If a battery is utilized for initial power, then a switching mechanism may be provided for switching the battery out of the circuit when the battery is no longer needed. For example, the method may comprise diode "OR"ing the battery and the first output storage device to the power input of the first power converter. Once the voltage of the first output storage device exceeds that of the battery; the battery is switched out. The first comparator circuit is adjusted so that the first output storage device voltage remains permanently above the battery voltage.

The method may also comprise providing a current control circuit operable for turning OFF the first integrated converter circuit when a current from the microbial fuel cell is greater than a predetermined current level and turning ON the first integrated converter circuit when the current from the microbial fuel cell is less than the predetermined current level.

The method may also comprise providing a voltage control circuit operable for turning OFF the first integrated converter circuit when the voltage from microbial fuel cell is lower than a predetermined voltage level and turning ON the first integrated converter circuit when the voltage from the microbial fuel cell is greater than the predetermined current level.

The method may further comprise electrically connecting the second output storage device to a power input of the second integrated converter circuit to power the second integrated converter circuit and may further comprise operating the second integrated converter circuit to produce an output hysteresis for the second storage device voltage with a cycle time of greater than one day.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
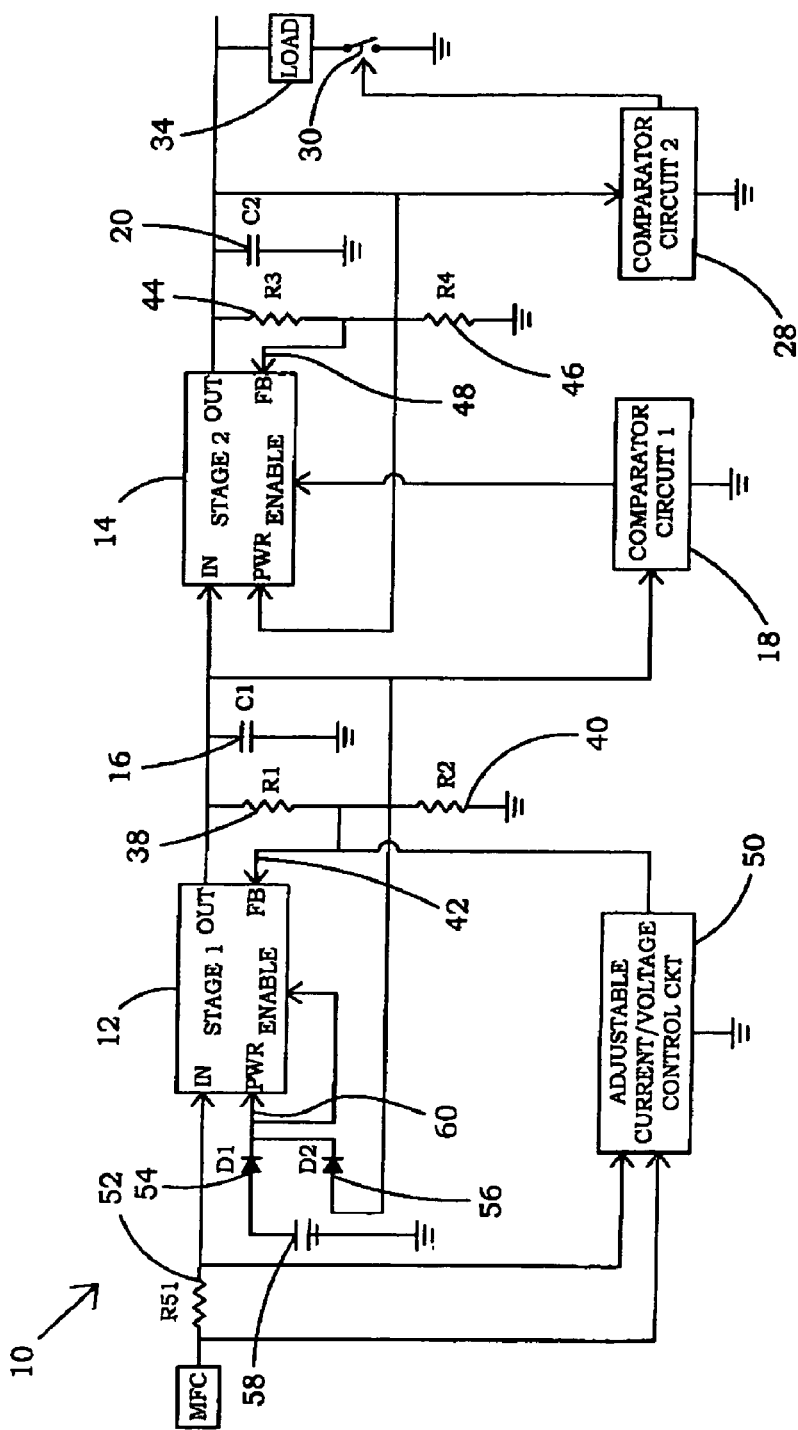
FIG. 1 is a block diagram of a two-stage energy conditioning and storage system (ECSS) in accordance with one embodiment of the present invention.

Referring now to FIG. 1, there is shown one embodiment of an energy conversion and storage system (ECSS) 10 which may be utilized in an unattended way with the output limitations of a MFC. The range of voltage level outputs of an MFC are shown at 11 and 13 in FIG. 2, which are approximately 0.8 VDC and 0.25 volts.

In one embodiment, the voltage levels at which the two stages of the ECSS 10 operate are user-configurable. As discussed in more detail, external capacitors may be utilized at the outputs of the two stages for energy storage and would have capacitance values that are application-specific and user-selectable. In one of many possible different embodiments, the ECSS 10 may be configured as follows:

1) MFC current limit: 0.1 ADC or MFC voltage limit: 0.5 VDC.

Figure 2:
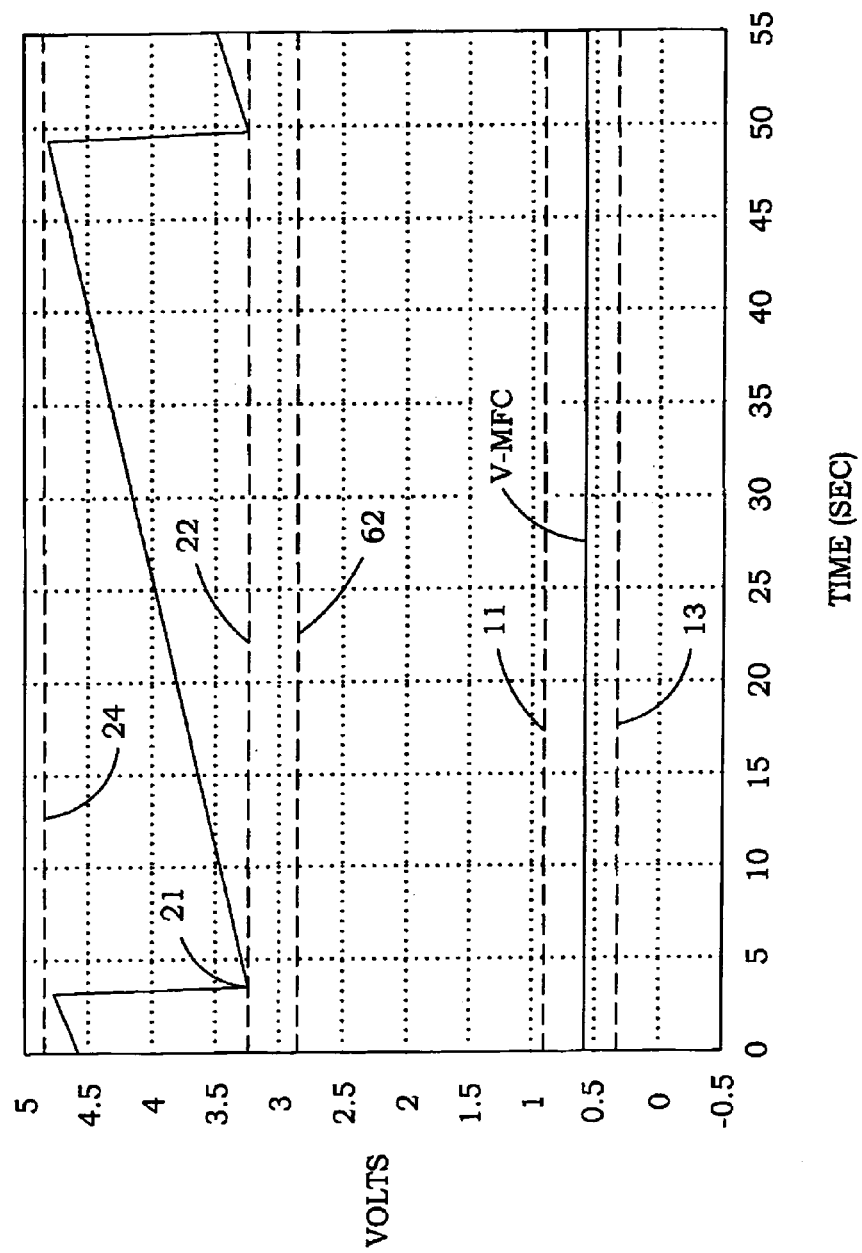
FIG. 2 is a graph of hysteresis voltage bands for the outputs of the first stage and second stage with respect to time (in seconds) showing operating characteristics voltages at various points in the circuit of FIG. 1 and including the MFC, in accordance with the present invention.
Figure 3:
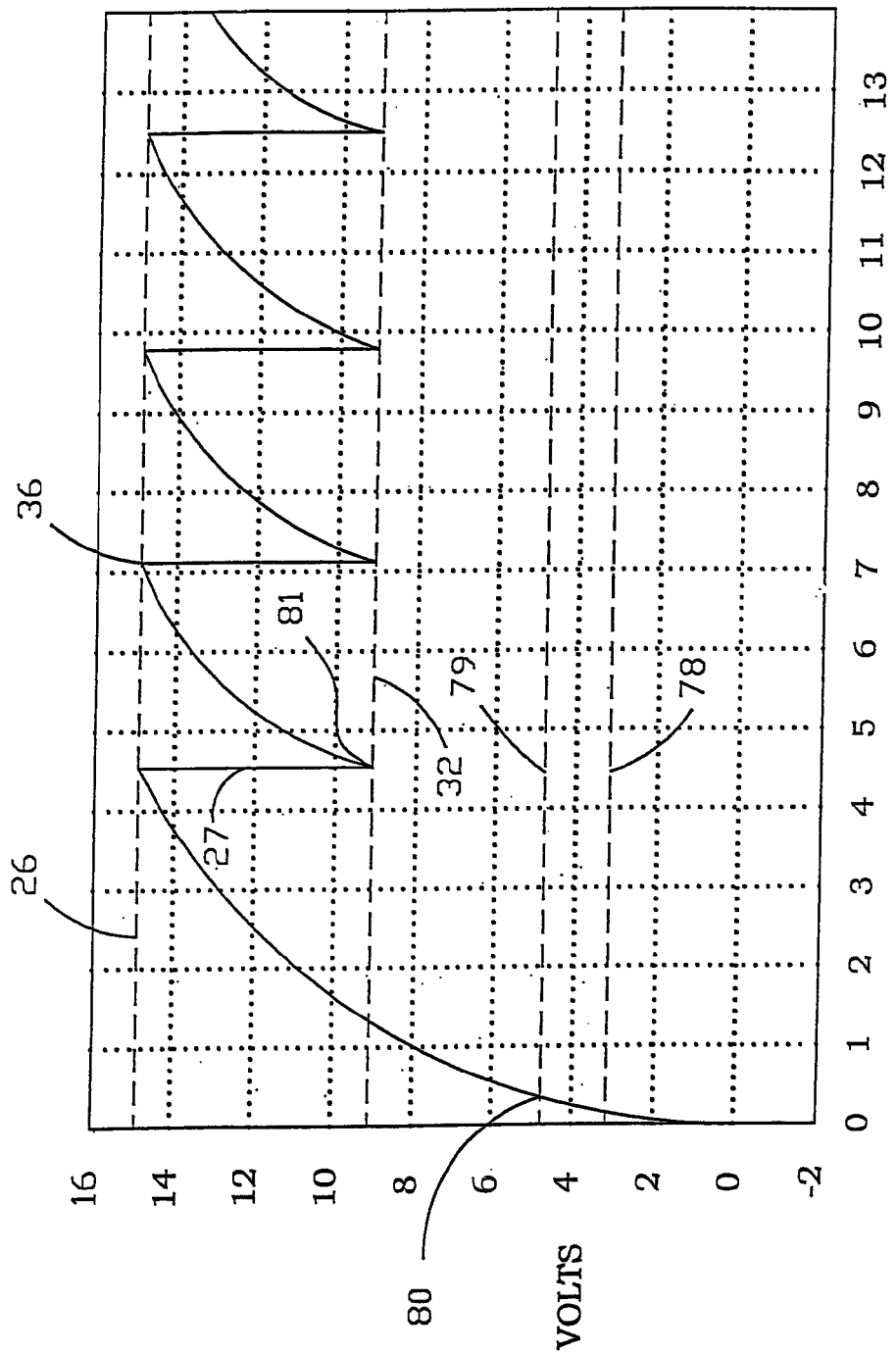
FIG. 3 is a graph of hysteresis voltage band for the output of the second stage with respect to time (in days).

2) Stage 1 output voltage hysteresis band: 3.3-4.85 VDC as indicated at 22 and 24 in FIG. 2 and 78 and 79 of FIG. 3.

3) Stage 2 output voltage hysteresis band: 9.25-14.8 VDC as indicated at 26 and 32 in FIG. 3.

4) Stage 1 storage capacitor C1 as indicated at 16 in FIG. 1: Sprague, 0.12 Farad, 40 VDC Electrolytic Barrel.

5) Stage 2 storage capacitor C2 (as indicated at 20 in FIG. 1): 58 Farad, 15 VDC Super-Capacitor.

6) ECSS 10 Load: 10 Ohm, 25 W, which may be a fixed resistor for testing or could be a sensor, pinger, or other device—some of which were discussed hereinbefore.

The ECCS 10 may comprise converter circuitry made up of two voltage boost converter stages (which are labeled stage 1 and stage 2 in FIG. 1) as designated by reference numerals 12 and 14, respectively. In this example, both stages are based on high efficiency boost converter integrated circuits which may be referred to herein as integrated converter circuits. However, the integrated converter circuit is provided herein only as an example. It will be understood that other types of integrated converter circuits may be utilized if the concepts of operation provided herein are implemented as discussed.

Stage 1 can be utilized to boost the MFC voltage (which can range from 0.25 VDC to 0.80 VDC) to approximately 5 VDC. Stage 2 boosts the 5 VDC output of Stage 1 to a user-selectable output voltage that can range from 6 VDC to 15 VDC. In this embodiment of the invention, the ECSS 10 is configured for a load that requires between 9 VDC and 15 VDC to operate. Therefore, two stages are required for the ECSS 10 because one stage is only capable of increasing or boosting the voltage by a factor of approximately ten. If the desired output were approximately 5 VDC or less, then conceivably the ECSS 10 could utilize only one stage.

In this embodiment, it is presumed that the power output from the MFC is limited to less than 150 mW continuous. The power output of stage 1 is cut approximately in half due to the fifty percent efficiency of the first stage. Efficiencies above fifty percent are not attainable in this first stage due to the very low voltage and current at the input.

Voltage drops across typical circuit components for stage 1 such as the boost inductor (not shown), blocking diode (not shown) and an internal MIC2145 switching device, that would typically be negligible in traditional converters, become substantial in a converter having such low voltage input and fairly high input current requirements. As discussed hereinbefore, typical circuit components for a desired converter integrated circuit can be found in related data sheets for a typical integrated converter circuit which may be utilized to implement the invention.

Assuming the input voltage and current levels are 0.5 VDC and 0.3 ADC respectively, the output of the first stage will be approximately 5 VDC and 0.015 ADC continuous assuming fifty percent efficiency. This output current level is not adequate to directly power most devices of interest. This output current level is also not even adequate to directly power the second boost stage, which can be made up of a similar integrated converter circuit used in Stage 1. For this reason, the second stage is initially held OFF and the power output from the first stage is stored or accumulated in capacitor C1 (as indicated at 16) which is located at the output of the first stage.

In this embodiment, the capacitor C1 acts as an output storage device for stage 1. The power in the capacitor C1 is also the input to stage 2. Comparator circuit 1 (as indicated at 18) may be utilized to measure the voltage output of stage 1 across the capacitor C1 and turn on stage 2 when the voltage across the capacitor C1 reaches a predetermined level. The turn ON and turn OFF voltages are preferably adjustable for different loads. While ON, an embodiment of stage 2 has been measured to have an efficiency of between eighty-five and ninety percent.

At startup, with adjustable current or voltage control circuit 50 set to 0.1 ADC, stage 1 is initially ON. The output of stage 2 tracks the output of stage 1 minus a diode drop even though stage 2 is off. This is due to the forward-biasing of the blocking diode (not shown) located across stage 2. The blocking diode, inductor and other circuit components can be found utilizing the data sheet discussed hereinbefore and known to those ordinarily skilled in the art. This blocking diode is intended to prevent the charge in the capacitor C2 from bleeding back into the capacitor C1. The output of stage 2 tracks the output of stage 1 for approximately the first 6.3 hours (approximately one quarter of a day), as indicated at 80 in FIG. 3.

Once the C1 voltage exceeds 4.85 VDC as indicated at 80, then the comparator circuit 1 turns on stage 2 and the power stored in the capacitor C1 is transferred to the capacitor C2 through utilizing the stage 2 boost converter 14, which may be referred to herein as a second integrated converter circuit. In a preferred embodiment, this voltage level is adjustable utilizing a potentiometer or other suitable means in the comparator circuit 1. In this embodiment, the transfer of charge from C1 to C2 takes approximately 0.5 seconds and continues until the voltage of C1 drops to approximately 3.3 VDC (as indicated at 21 in FIG. 2) at which time the comparator circuit 1 turns stage 2 OFF. At this point, stage 1 resumes charging C1 until it once again reaches 4.85 VDC. Thus, a hysteresis band of voltage output or voltage across C1 cycles between 4.85 VDC and 3.3 VDC as indicated at 22 and 24. These voltages are preferably adjustable utilizing adjustable resistors in the comparator circuit 1.

In this embodiment, approximately forty seconds are needed for stage 1 converter to charge C1 back up to 4.85 VDC. Thus, the hysteresis cycle time for the output voltage of stage 1 is approximately forty seconds (which is much shorter than the hysteresis cycle time of the output of stage 2) which in this embodiment is over two days.

While ON, stage 2 works to boost or increase the voltage on C2 to a user-specified voltage, which in this embodiment is 14.8 VDC maximum voltage level, as indicated at 26 in FIG. 3.

Once the voltage on C2 exceeds approximately 14.8 VDC, then comparator circuit 2 (as indicated at 28) acts as a load control and turns ON the load by turning on the load control Metal-Oxide-Field-Effect-Transistor (MOSFET) represented by SW1 (as indicated at 30 in FIG. 1). After turning SW1 ON, the power stored in the capacitor C2 dissipates from 14.8 VDC to approximately 9.25 VDC, (as indicated at 32 in FIG. 3) through the attached load (as indicated at 34 in FIG. 1). The discharge time is a function of the power consumption/current draw of the load, which in this example is a fixed 10 Ohm resistor.

Once the voltage across C2 drops below 9.25 VDC (as indicated at 81 of FIG. 3), the comparator circuit 2 turns OFF SW1 and the load 34 is disconnected. Thus, the hysteresis voltage band for the output of stage two varies between 14.8 VDC and 9.25 VDC (as indicated at 26 and 32 in FIG. 3). In this embodiment, the discharge of C2 into a 10 Ohm resistive load occurred over a period of approximately 4.25 minutes as indicated at discharge voltage drop 27 in FIG. 3. The load remains OFF until C2 charges back up to 14.8 VDC where the discharge cycle repeats. These voltages are preferably adjustable utilizing potentiometers or the like in the comparator circuit 2.

In this embodiment, approximately 2.5-2.75 days are needed for the system to charge C2 back up to 14.8 VDC (as indicated at 36 in FIG. 3). Thus, the cycle time for the hysteresis voltage band for stage two is about 2.5-2.75 days. In other words, after the initial charge period, the charge/discharge cycle of C2 repeats continuously approximately every 2.5-2.75 days as indicated in FIG. 3.

A target output voltage set point of both stages is set by sensing the voltage at the stage's output and attenuating this voltage and then feeding the sensing to the feedback input (FB) of the corresponding boost converter IC, or integrated converter circuit.

The voltage level at the feedback pin governs the mode of operation stage 1 and stage 2. Each stage will continue to attempt to increase the output until the desired set-point is achieved. The feedback attenuation is achieved through voltage dividers made up of resistors R1 to R4.

For example in stage 1, resistors R1 and R2 (as indicated at 38 and 40 in FIG. 1) divide the voltage output so that feedback is provided at feedback input (FB) 42. When the resistor divided voltage from the output of the stage is below the desired set point (in this example, when voltage at the feedback input 42 is less than approximately 1.08 V), then the converter continues to operate in boost mode.

Once the output reaches or exceeds the desired set-point (voltage at the feedback input 42 exceeds approximately 1.08 V), then the stage goes into an idle mode and no longer produces power at the output. Thus, if power is not used by the by the second stage 14, then the circuit will stop trying to increase the output voltage. Resistors R3 and R4 (as indicated at 44 and 46) produce a similar feedback to feedback input 48 of stage 2.

For use with an MFC, input current or voltage limiting is preferably utilized for the stage 1 converter utilizing the adjustable current/voltage control circuit 50. The MFC voltage will gradually decay to a very low level (possibly 0 VDC) if too much power is drawn. This is due to the limited continuous power availability and finite replenishment/rejuvenation rate of the power producing microbes of the MFC. For this reason, the current/voltage control circuit 50 is incorporated into stage 1. When in current control mode 50, the voltage monitors across current sense R51 (as indicted by 52). When in voltage control mode 50, the voltage monitors at the input of the first stage.

In current control mode, if the voltage across R51 goes above a pre-determined value, then the current being drawn from the MFC is too high and the current control circuit 50 will override the voltage divider feedback—discussed hereinbefore at the feedback input 42. In this case, the current control circuit 50 produces a voltage greater than 1.08 V thereby placing the converter of stage 1 into the idle mode discussed hereinbefore. The control circuit 50 is preferably adjustable, such as by using a potentiometer and/or other means, so that the amount of current limiting can be tailored to a specific MFC.

In voltage control mode, if the voltage at the input of the first stage goes below a pre-determined value, then the current being drawn from the MFC is too high and the current voltage circuit 50 will override the voltage divider feedback—discussed hereinbefore at the feedback input 42. In this case, the current/voltage control circuit 50 produces a voltage greater than 1.08 V; thereby, placing the converter of stage 1 into the idle mode discussed hereinbefore. The control circuit 50 is preferably adjustable, such as by using a potentiometer and/or other means, so that the voltage control setpoint can be tailored to a specific MFC.

The low voltage output of the MFC is too low to power the ECCS 10 at the initial start up of the circuit. The ECCS 10 requires a voltage of about 2.8 VDC (as indicated at 62 in FIG. 2) which is much greater than the MFC maximum voltage of about 0.8 VDC (as indicated at 11 in FIG. 2). Nonetheless, during normal operation, the ECCS 10 is self-powered.

During normal operation, stage 1, the comparator circuit 1, the comparator circuit 2, and the current control circuit are powered from the output of stage 1 (power stored in C1). Stage 2 is powered off of its own output (power stored in C2). Reviewing FIG. 1, it will be seen that voltage across C1 is applied to D2, (as indicated at 56) which connects to the power input of the integrated converter circuit of stage 1. Likewise, the power from C2 is applied to the power input of the integrated converter circuit of stage 2.

The integrated circuits used in Stage 1 and Stage 2 along with the operational amplifiers and analog comparator integrated circuits of controls 18, 28, and 50 used to control the converters and load each require a minimum of 2.5 VDC to operate. However, at startup, C1 and C2 may be discharged at 0 VDC, in which case no power is available to run the circuitry.

For this reason, a 3.3 VDC lithium battery (as indicated at 58) may be diode "OR"ed using D1 and D2 (as indicated as 54 and 56) with the voltage across C1. Thus initially, power is supplied to power input 60 for stage 1 utilizing the lithium battery 58 with power going through D1 to the power input of the integrated converter circuit of stage 1. While C1 charges, the lithium battery 58 provides power to stage 1. Once the voltage at C1, which is the output voltage of stage 1, exceeds the battery voltage, the battery is permanently switched out by the diode "OR" circuit because the voltage at 60 is higher than the voltage of the battery so that D1 is reverse-biased. At this time the lithium battery 58 is no longer required and is automatically switched out of the circuit.

Accordingly, the ECCS 10 enables the relatively small levels of power generated by a MFC to be collected and used in applications requiring larger amounts of power than is continuously available from the MFC alone. Furthermore: the ECCS 10 operates with input voltage ranges much lower than that of commercial step-up converters and DC/DC converters; the ECCS 10 output voltages can be easily reconfigured to meet input voltage range requirements of various electrical loads; and the ECCS 10 incorporates input current limiting circuitry that is user-adjustable. This allows for user-adjustment of power level drawn from MFC system to optimize MFC performance. Additionally, the ECCS 10 can charge a large range of storage devices such as capacitors (including super-capacitors) and batteries.

An onboard battery, such as the lithium battery 58, is only used at startup. This startup battery is switched out permanently after output of first stage exceeds the startup battery voltage. Beyond this point, the startup battery is no longer used and should never need replacement after the system is started and remains ON.

Further advantages of the system of the present invention are that: the ECCS 10 avoids the need for large and bulky custom wound transformers; the ECCS 10 permits flexibility in input current control and voltage output level adjustments;

the ECCS 10 provides an efficient, small size and weight, circuit; and the ECCS 10 provides smart circuitry that controls the transfer of energy from stage 1 to stage 2, which increases effectiveness of second stage to charge various different storage devices. This is due to the much higher current levels present during the transfer from Stage 1 to Stage 2.

Furthermore, the ECCS 10 provides smart circuitry that strategically turns ON and OFF the load at user selectable levels of the converter output voltage. Also, the ECCS 10 provides long duration performance and production of varieties of output voltages demonstrated.

Various changes in the circuitry may be utilized. For example, the second stage could be replaced with an off-the-shelf DC-DC converter as long as this DC/DC converter has an Enable input that can be controlled by the comparator circuit 1.

A battery can be used at the output of the second stage instead of the super capacitor (C2) described in this disclosure. This is possible due to the controlled periodic transfer of energy from stage 1 to stage 2 that results in a much higher current level passing through stage 2 into the storage device connected to the output of stage 2. If stage 2 were always on, the resulting current levels would not be sufficient to overcome the minimum required charge current requirements of most rechargeable batteries.

The first stage could be reconfigured to perform input voltage control such that its input power draw would be regulated in such a way to maintain a desired MFC input voltage level. A secondary current limit could be incorporated that would override the input voltage control.

The onboard battery 58 could be eliminated if C1 were manually charged to a sufficient level (e.g. about 4 VDC) after connecting to the MFC.

The present converter uses a more compact and efficient boost converter topology. A current limit at the input to the converter is user adjustable based on the MFC system configuration and anticipated performance. The present converter stores the power harvested from the MFC and automatically applies power to the device/sensor.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An energy conversion and storage system for use with a microbial fuel cell in powering an electrical load wherein the microbial fuel cell produces an output voltage of less than 0.8 VDC, said system comprising:
    a first power converter stage electrically connected to the microbial fuel cell, said first power converter stage including a first integrated converter circuit and a first output storage device with said first integrated converter circuit including a power input for operating power of said first integrated converter circuit wherein said first output storage device is electrically connected to said power input of said first integrated converter circuit to provide operating power to said first integrated converter circuit;
    means for providing operating power to said first integrated converter circuit to allow said first output storage device sufficient charging to provide operating power for said first integrated converter circuit;
    a second power converter stage operably connected to said first output storage device with said second power converter stage including a second integrated converter circuit and a second output storage device;
    a first comparator circuit operable for turning ON said second power converter stage when a first output storage device voltage reaches a first predetermined voltage level and for turning OFF said second power converter stage when said first output storage device voltage drops to a second predetermined voltage level which is less than said first predetermined voltage; and
    a second comparator circuit operable to connect said second output storage device to said electrical load when a second output storage device voltage reaches a first predetermined load voltage level and for disconnecting said second output storage device from said electrical load when said second output storage device voltage drops to a second predetermined load voltage level which is less than said first predetermined load voltage level.

2. The energy conversion and storage system of claim 1 wherein said means for powering said first integrated converter circuit further comprises:
    a battery; and
    a diode "OR"ing circuit electrically connected to said power input of said first integrated converter circuit, said battery and said first output storage device with said "OR"ing circuit being operable to electrically connect said battery to said power input of said first power converter stage to initially provide operating power for said first integrated converter circuit and with said diode "OR"ing circuit being operable to disconnect said battery from said power input of said first integrated converter circuit after said first output storage device is sufficiently charged to power said first integrated converter circuit.

3. The energy conversion and storage system of claim 1 further comprising a current control circuit operable for turning OFF said first integrated converter circuit when a current from the microbial fuel cell is greater than a predetermined current level and turning ON said first integrated converter circuit when the current from the microbial fuel cell is less than the predetermined current level.

4. The energy conversion and storage system of claim 3 wherein the predetermined current level is adjustable.

5. The energy conversion and storage system of claim 1 wherein said second output storage device is electrically connected to a power input of said second integrated converter circuit to provide operating power for said second integrated converter circuit.

6. The energy conversion and storage system of claim 1 wherein said second integrated converter circuit is operable for producing an output hysteresis band for said second output storage device voltage with a cycle time of greater than one day.

7. A method for energy conversion and storage for use with a microbial fuel cell in powering an electrical load wherein the microbial fuel cell produces an output voltage of less than 0.8 VDC, said method comprising the steps of:
    electrically connecting a first power converter stage to the microbial fuel cell;
    providing a first output storage device and a first integrated converter circuit for the first power converter stage;
    electrically connecting the first output storage device to a power input of the first integrated converter circuit to provide operating power for the first power converter stage;
    initially providing operating power for the first integrated converter circuit until the first output storage device is sufficiently charged to provide operating power for the first integrated converter circuit and afterwards providing operating power for the first integrated converter circuit utilizing power from the first output storage device;

providing a second power converter stage which comprises a second output storage device and a second integrated converter circuit;

providing a first comparator circuit for turning ON the second integrated converter circuit when a first output storage device voltage reaches a first predetermined voltage level and for turning OFF the second integrated converter circuit when the first output storage device voltage drops to a second predetermined voltage level which is less than the first predetermined voltage; and providing a second comparator circuit to connect the second output storage device to the electrical load when a second output storage device voltage reaches a first predetermined load voltage level and for disconnecting the second output storage device from the electrical load when the second output storage device voltage drops to a second predetermined load voltage level which is less than the first predetermined load voltage level.

8. The method of claim 7 said method further comprising the steps of:

utilizing a battery for initially providing operating power for the first integrated converter circuit until the first output storage device is sufficiently charged to provide operating power for the first integrated converter circuit;

electrically connecting a diode "OR"ing circuit to the power input of the first power converter, the battery and the first output storage device;

utilizing the diode "OR"ing circuit to electrically connect the battery to the power input of the first integrated converter circuit to initially provide operating power for the first integrated converter circuit; and utilizing the diode "OR"ing circuit to disconnect the battery from the power input of the first integrated converter circuit after the first output storage device is sufficiently charged to power the first integrated converter circuit.

9. The method of claim 7 further comprising providing a current control circuit operable for turning OFF the first integrated converter circuit when a current from the microbial fuel cell is greater than a predetermined current level and turning ON the first integrated converter circuit when the current from the microbial fuel cell is less than the predetermined current level.

10. The method of claim 9 further comprising the step of providing that the predetermined current level is adjustable.

11. The method of claim 7 further comprising the step of providing a voltage control circuit for turning OFF the first integrated control circuit when the voltage from the microbial fuel cell is less than a predetermined voltage level and turning ON the first integrated converter circuit when the voltage from the microbial fuel cell is greater than the predetermined voltage level.

12. The method of claim 11 further comprising the step of providing that the predetermined current level is adjustable.

13. The method of claim 7 further comprising electrically connecting the second output storage device to a power input of the second integrated converter circuit to power the second integrated converter circuit.

14. The method of claim 7 further comprising the step of operating the second integrated converter circuit to produce an output hysteresis for the second storage device voltage with a cycle time of greater than one day.

* * * * *